(12) United States Patent
Moeller et al.

(10) Patent No.: US 9,706,753 B2
(45) Date of Patent: Jul. 18, 2017

(54) MULTI-PURPOSE ANIMAL GROOMING TOOLS

(71) Applicant: WAHL CLIPPER CORPORATION, Sterling, IL (US)

(72) Inventors: Shay Moeller, Rock Falls, IL (US); Carter McGuyer, Tuscumbia, AL (US); Christian Zachrich, Fort Wayne, IN (US); Bruce Kramer, Sterling, IL (US); Shelly Johnson, Sterling, IL (US)

(73) Assignee: WAHL CLIPPER CORPORATION, Sterling, IL (US)

( * ) Notice: Subject to any disclaimer, the term of this patent is extended or adjusted under 35 U.S.C. 154(b) by 39 days.

(21) Appl. No.: 14/516,755

(22) Filed: Oct. 17, 2014

(65) Prior Publication Data

US 2015/0107528 A1 Apr. 23, 2015

Related U.S. Application Data

(60) Provisional application No. 61/893,496, filed on Oct. 21, 2013.

(51) Int. Cl.
*A01K 13/00* (2006.01)
*A46B 5/00* (2006.01)
*A46B 9/02* (2006.01)
*A46D 1/00* (2006.01)

(52) U.S. Cl.
CPC .......... *A01K 13/002* (2013.01); *A46B 5/0008* (2013.01); *A46B 9/023* (2013.01); *A46D 1/0253* (2013.01); *A46B 2200/1093* (2013.01)

(58) Field of Classification Search
CPC .... A01K 13/002; A46B 5/0008; A46B 9/028; A46B 9/02; A46B 9/023; A46B 2200/1093; A46D 1/0253; A46D 1/0284
See application file for complete search history.

(56) References Cited

U.S. PATENT DOCUMENTS

| D159,361 | S | 5/1948 | Nussbaum | |
|---|---|---|---|---|
| 2,713,324 | A * | 7/1955 | Thaete | A01K 13/002 |
| | | | | 119/632 |
| 4,479,501 | A | 10/1984 | Chern | |
| D378,958 | S | 4/1997 | Yu | |
| D471,718 | S | 3/2003 | Park | |
| 6,851,451 | B2 | 2/2005 | Hoefling | |
| D509,032 | S | 8/2005 | Dunn et al. | |
| D616,649 | S | 6/2010 | Lin | |
| 8,595,885 | B1 * | 12/2013 | Weinstein | A46B 9/06 |
| | | | | 119/612 |
| 2009/0211047 | A1 * | 8/2009 | Chen | A46D 1/00 |
| | | | | 15/207.2 |
| 2010/0269278 | A1 * | 10/2010 | Huang | A46B 15/0055 |
| | | | | 15/167.1 |

* cited by examiner

*Primary Examiner* — Monica Williams
*Assistant Examiner* — Jessica Wong
(74) *Attorney, Agent, or Firm* — Greer, Burns & Crain, Ltd.

(57) ABSTRACT

A brush configured for removing debris and hairs is provided. Included in the brush are at least one surfaced body having a pad, and a plurality of first bristles extending from the pad. One end of each first bristle is connected to the pad, and an opposite free end of each first bristle has a radially extending head portion. At least one additional head portion is disposed in a spaced relationship along a longitudinal axis of the first bristle.

5 Claims, 12 Drawing Sheets

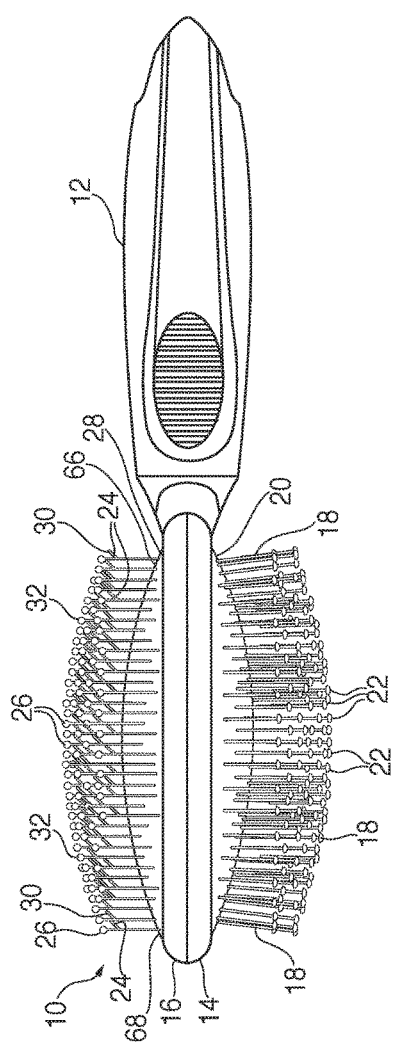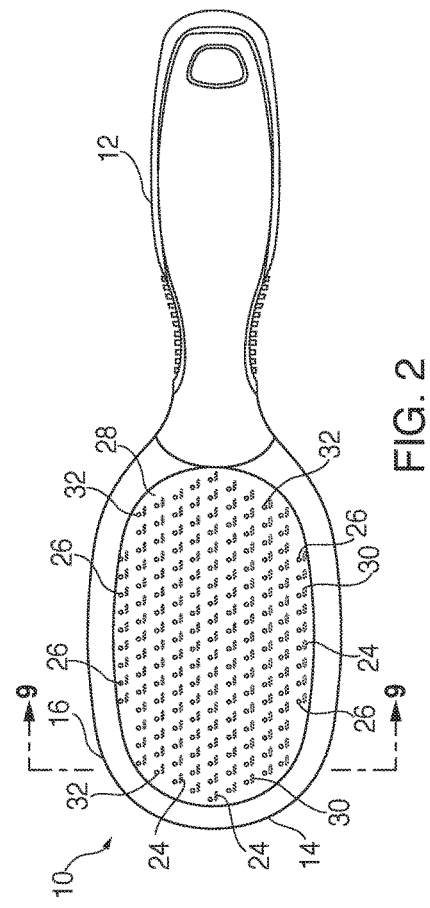

DETAIL A

DETAIL B

MULTI-PURPOSE ANIMAL GROOMING TOOLS

CROSS-REFERENCE

This application claims priority of U.S. Provisional Application Ser. No. 61/893,496, filed Oct. 21, 2013 under 35 U.S.C. §119(e), which is incorporated herein by reference.

BACKGROUND

The present disclosure generally relates to animal grooming devices, and more particularly relates to a multi-purpose hand-held animal grooming tool configured for various purposes, such as brushing and carding animal hairs coat or fur.

Infrequent grooming of a domestic animal causes an unwanted accumulation of loose hairs, dander, and surface debris on the animal's skin or in the fur or coat. When these elements are left uncleaned from the animal, homes of animal owners become filled with the loose hairs and other debris, incurring cleaning and maintenance costs for keeping a home free of these elements. An effective solution is to regularly remove the loose hairs and debris from the animal's coat. For example, conventional hand-held grooming tools, such as brushes and combs, remove the loose hairs as the animal approaches a shed cycle, as well as dander and surface debris.

While conventional tools are functional and partly effective, they present problems for homeowners and professional groomers because each tool serves only one particular purpose at a time, and the homeowners or groomers must resort to other, separate tools for different grooming purposes. Thus, incorporating a grooming device having multiple purposes is needed to save operating time and related costs.

SUMMARY

The present disclosure is directed to a multi-purpose, hand-held animal grooming tool constructed and arranged for attending various grooming needs. As described in further detail below, the present animal grooming tool includes a combo brush having dual bristle beds on a single body having a handle for gripping. Each bristle bed has specially configured bristles and is designed for serving a different purpose. A first bristle bed has a plurality of multiple head pin bristles designed for removing loose hairs. A second bristle bed has a combination of bristles, a first plurality of rounded-end wire bristles designed for gently stimulating an animal skin, and another plurality of ball end or rounded end bristles designed for removing the loose hairs.

In one embodiment, a brush configured for removing debris and hairs is provided. Included in the brush are at least one surfaced body having a pad, and a plurality of first bristles extending from the pad. One end of each first bristle is connected to the pad, and an opposite free end of each first bristle has a radially extending head portion. At least one additional head portion is disposed in a spaced relationship along a longitudinal axis of the first bristle.

In another embodiment, a brush configured for removing debris and hairs is provided. Included in the brush are at least one surfaced body having a pad, and a plurality of first bristles and a plurality of second bristles extending from the pad in an alternating pattern. One end of each first bristle is connected to the pad, and an opposite free end of each first bristle has an angled end. One end of each second bristle is connected to the pad, and an opposite free end of each second bristle has a rounded end.

In yet another embodiment, a brush configured for removing debris and hairs is provided. Included in the brush are at least one surfaced body having a pad, and a plurality of first bristles extending directly uprightly from the pad. One end of each first bristle is connected to the pad, and an opposite free end of each first bristle is constructed and arranged in a corrugated configuration. Each first bristle has a corrugated shape in a longitudinal direction, and the plurality of first bristles extends substantially vertically from the pad.

BRIEF DESCRIPTION OF THE DRAWINGS

FIG. 1 is a front view of the present combo brush, featuring a double-sided body having first bristles arranged on a bottom surface, and second and third bristles arranged on an opposite top surface;

FIG. 2 is a plan view of the combo brush of FIG. 1, showing the second and third bristles;

DETAILED DESCRIPTION

Figure 4:
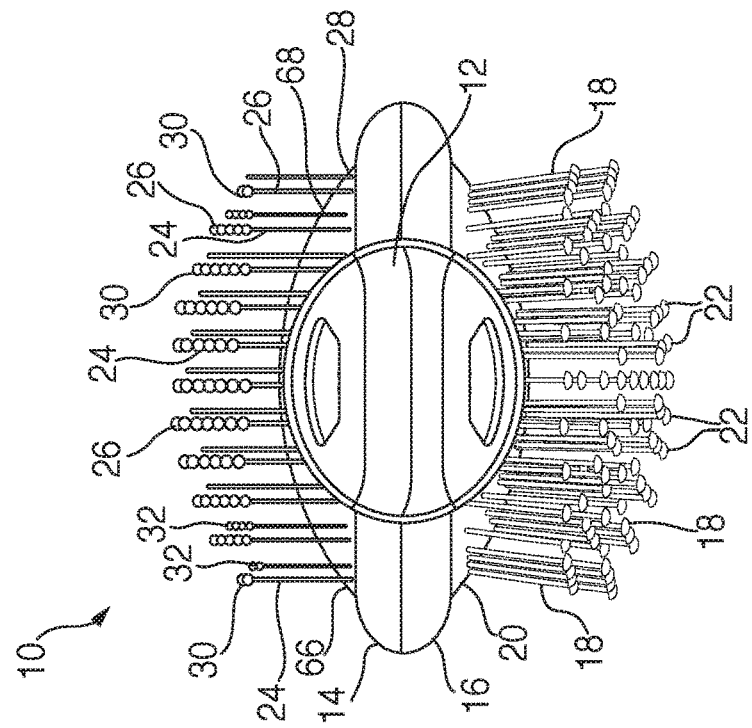
FIG. 4 is a right side view of the combo brush of FIG. 1.
Figure 3:
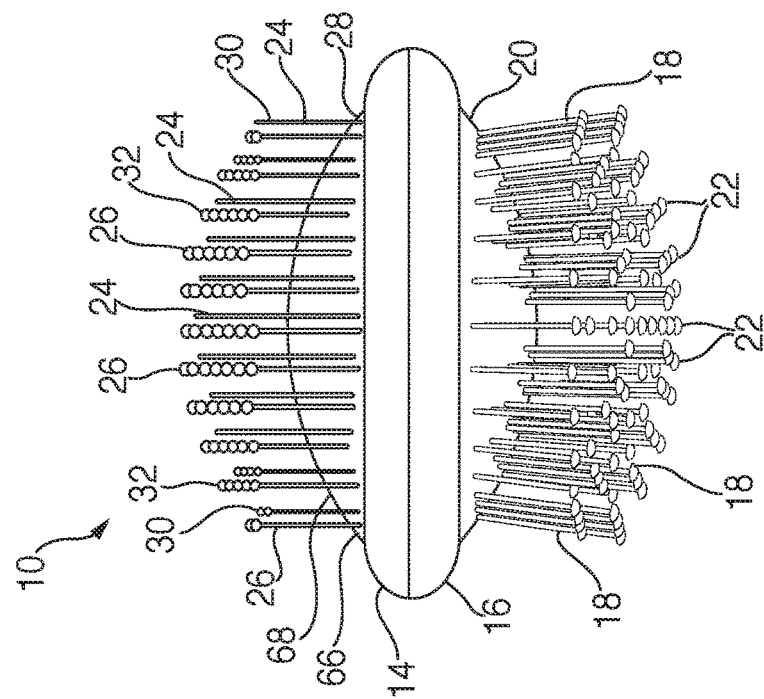
FIG. 3 is a left side view of the combo brush of FIG. 1.

Referring now to FIGS. 1-4, an exemplary pet or animal combo brush is generally designated 10, and is designed to remove debris while pulling out dead hairs and also gently stimulating a skin of an animal underneath the hairs. Included in the combo brush 10 are an elongated handle 12 and a generally oval-shaped double-sided or double working surfaced body 14. Preferably, the body 14 has a radiused circumferential edge 16. A plurality of first bristles 18 extends directly uprightly from a first pad or working surface 20 of the body 14. One end of each first bristle 18 is connected to the first pad 20, and an opposite free end has a radially extending head portion 22.

One aspect of the present brush 10 is that a plurality of second bristles 24 and a plurality of third bristles 26 extend directly uprightly from a second pad or working surface 28 of the body 14 in an alternating pattern. Although other arrangements are contemplated, one exemplary pattern is to arrange the second and third bristles 24, 26 in alternating rows extending transverse to the longitudinal axis of the body 14. One end of each second bristle 24 is connected to the second pad 28, and an opposite free end has an angled end 30, preferably right angled (i.e., "L"-shaped), but other orientations are contemplated. While the first surface 20 is located on a bottom of the brush 10 and the second surface 28 is on the top of the brush, it is contemplated that the positions may be reversed.

Figure 5:
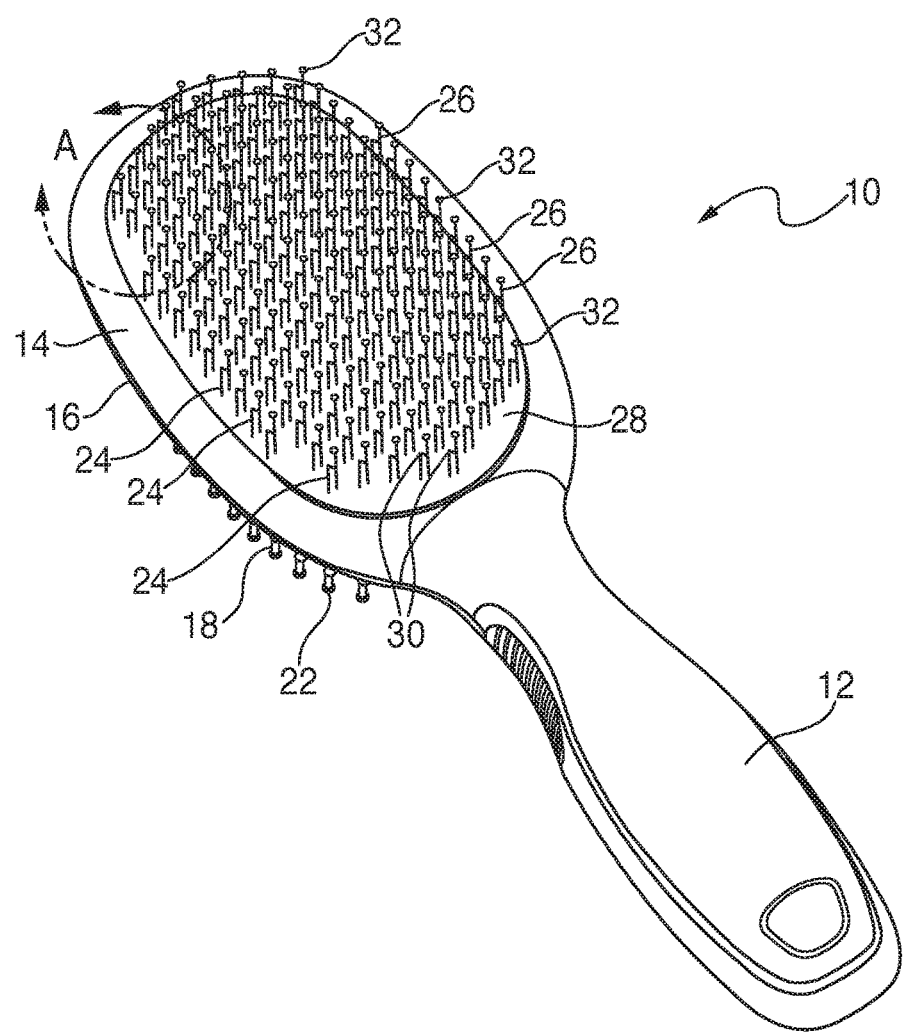
FIG. 5 is a top perspective view of the combo brush of FIG. 1, showing the second and third bristles on the top surface.
Figure 6:
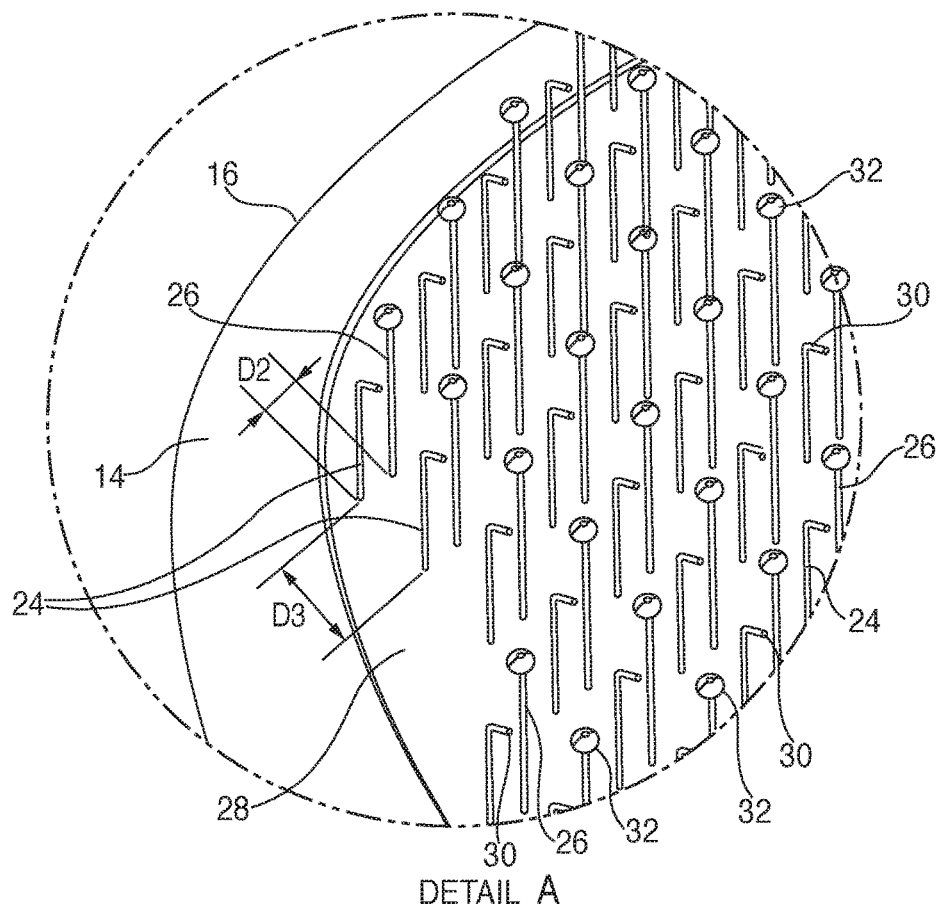
FIG. 6 is a partial, enlarged view of a circled portion A of the combo brush of FIG. 5.

Referring now to FIGS. 1 and 5-6, groups of various nonlinear angles are contemplated for the angled ends 30 of the second bristles 24, such as 30°, 45°, and 90° angled ends, but other suitable obtuse or acute angled ends are also contemplated to suit different applications. In practice, acute angled (less than 90°) ends may be suitable for animals coated with a relatively thin layer of hairs or lower hair density, but obtuse angled (between 90° and 180°) ends may be suitable for animals coated with a thick layer of hairs, or greater hair density. As described in greater detail below, regardless of the hair type of the animal, this configuration of the second and third bristles 24, 26 prevents harmful skin damage caused by the sharp, angled end 30 of the second bristle 24 while accomplishing desired grooming purposes.

It is contemplated that one end of each third bristle 26 is connected to the second pad 28, and an opposite free end has a rounded or looped shape 32. It is preferred that each rounded end 32 is made of or encased by soft materials, such as rubber, bio-plastic, and silicone materials, but other suitable metallic materials, such as stainless, are also contemplated. Alternatively, each end 32 forms an opened loop as an extension of the third bristle 26. An exemplary outer diameter of each end 32 is approximately 1 millimeter or 0.012 inch. Although the rounded or looped ends 32 are shown, other suitable geometric shapes are also contemplated. In a preferred embodiment, the third bristle 26 has a dimension in a longitudinal direction that is longer than the similar dimension of the second bristle 24. Having the rounded ends 32 allows a gentle contact with the animal's skin while grooming. This gentle contact stimulates the animal's skin, and promotes generation of skin oil for rejuvenating healthy skin and hair.

Figures 6A, 6B:
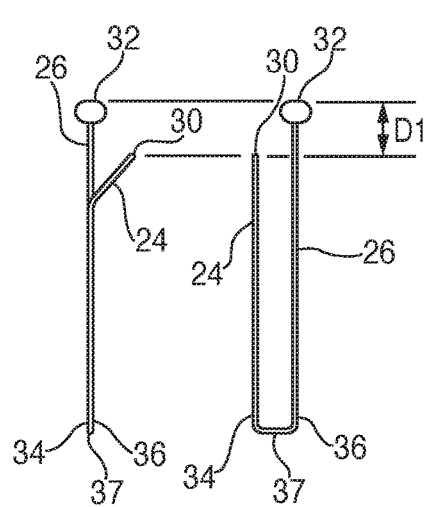
FIG. 6A is an enlarged front elevation view of exemplary second and third bristles of the combo brush of FIG. 6.
FIG. 6B is an enlarged elevation of exemplary second and third bristles of the combo brush of FIG. 6.

Referring now to FIGS. 6 and 6A, because the third bristle 26 with the rounded end 32 is taller than the second bristle 24 by a predetermined distance D1, the third bristle 26 contacts the animal's skin before the second bristle 24, thereby reducing a direct skin contact with the sharp, angled end 30 of the second bristle 24. As illustrated in FIGS. 6A-6B, the distance D1 creates or forms a buffer zone between the animal's skin and the sharp, angled end 30 of the second bristle 24. An exemplary distance D1 (FIG. 6A) defined by an outermost end of the second bristle 24 and the outermost end of the third bristle 26 preferably ranges between 1/16 and 1/4 inch, however this dimension may vary to suit the application.

Further, the second and third bristles 24, 26 in alternating rows are arranged in a spaced relationship with respect to each other, providing a predetermined distance or width between adjacent bristles. An exemplary distance or width D2 (FIG. 6) defined by space between longitudinal axes of the second and third bristles 24, 26 preferably ranges between 0.067 and 0.197 inches. Another predetermined distance or width D3 (FIG. 6) defined by space between two adjacent second bristles 24 (or third bristles 26) preferably ranges between 0.197 and 0.250 inches. These dimensions may vary to suit the application. As a result of this configuration having three different distances D1, D2, D3, the rounded ends 32 of the third bristles 26 operate as a guard or protector for preventing the angled ends of the second bristles 24 from damaging the animal's skin.

Referring now to FIGS. 1 and 6A-6B, another important aspect of the present brush 10 is that the second bristles 24 and the third bristles 26 are attached together at their corresponding lower ends 34, 36 by a bridge 37 located opposite from the free ends of the second and third bristles, forming a "U"-shaped pin. The combined bristles 24, 26 are mounted on, and extend uprightly from, the second pad 28 of the body 14. More specifically, the bridge 37 is maintained on an inside of the pad 28, and the bristles 24, 26 project through corresponding holes in the pad. Attachment of the "U"-shaped pin to the second pad 28 of the body 14 is described in greater detail below in FIG. 9.

Figure 7:
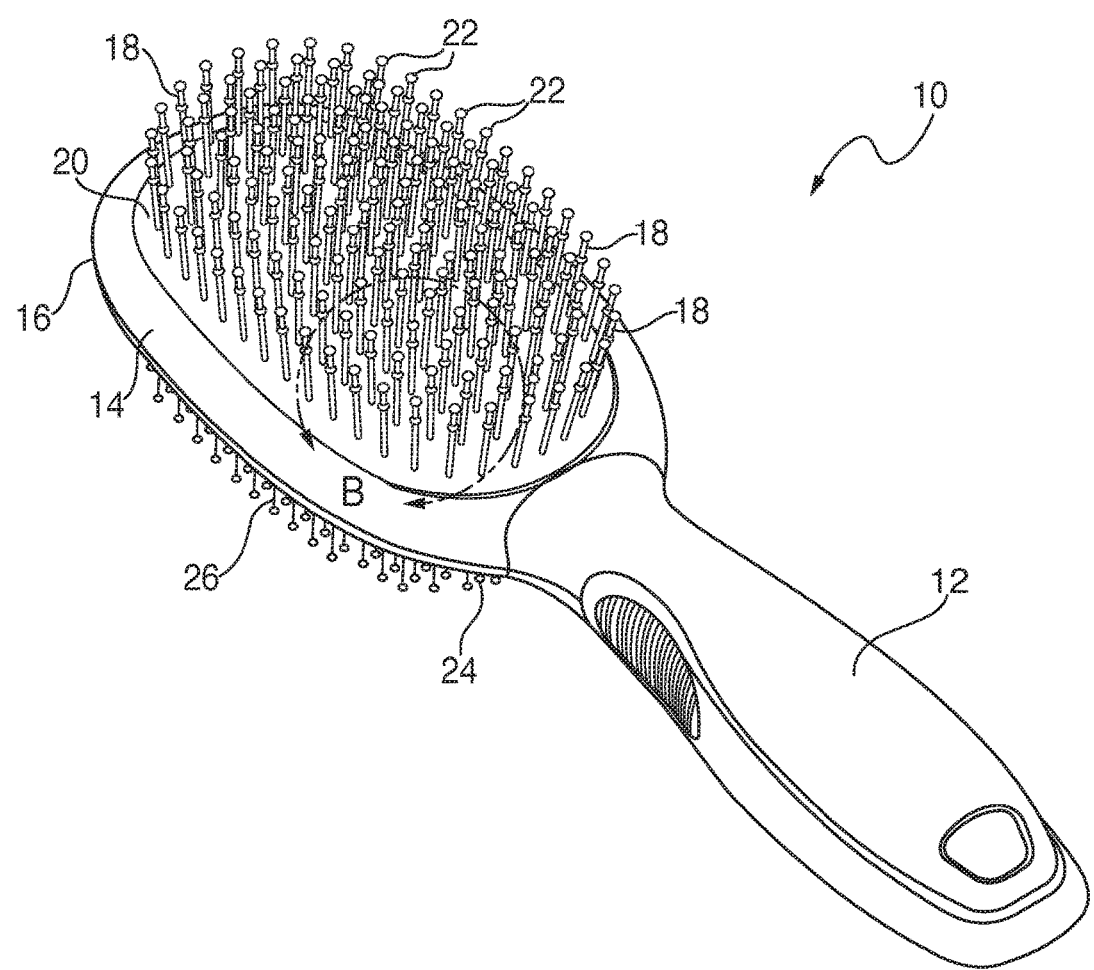
FIG. 7 is a bottom perspective view of the combo brush of FIG. 1, showing the first bristles on the bottom surface.
Figure 8:
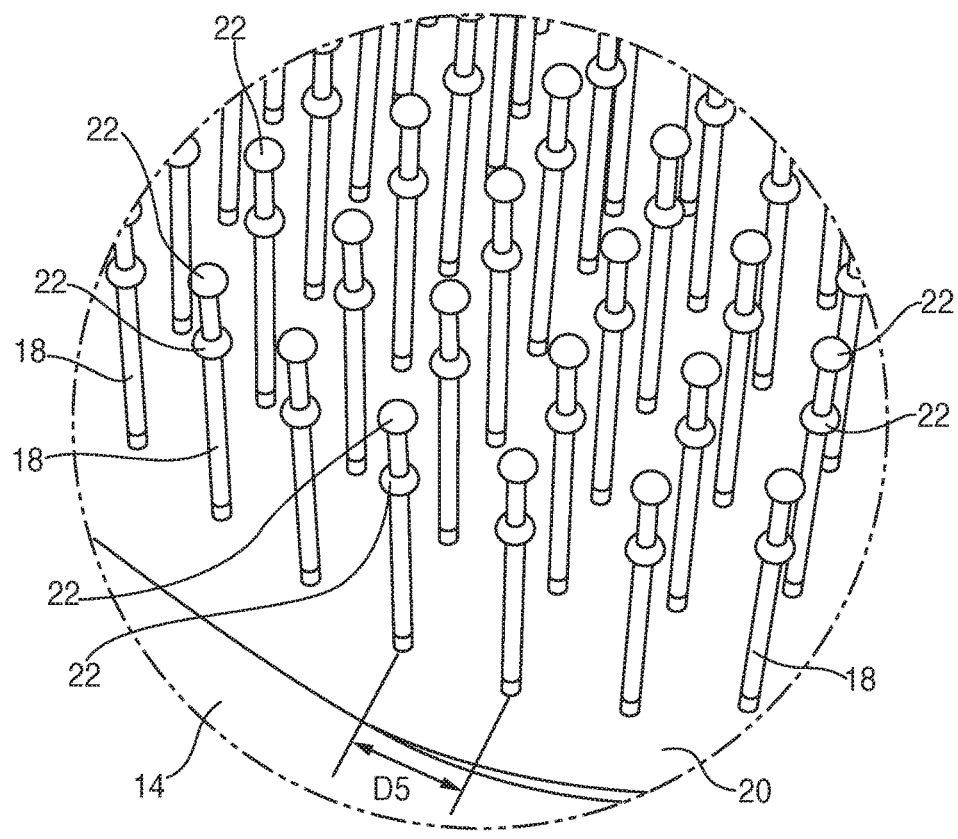
FIG. 8 is a partial, enlarged view of a circled portion B of the combo brush of FIG. 7.
Figure 8A:
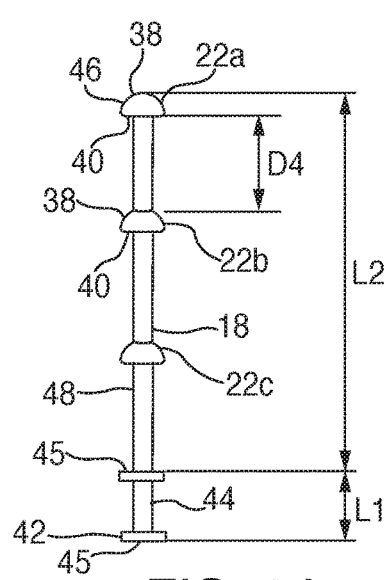
FIG. 8A is an enlarged front elevation view of an exemplary first bristle of the combo brush of FIG. 8.

Referring now to FIGS. 7, 8 and 8A, at least one additional head portion 22 is disposed in a spaced relationship along a longitudinal axis of the first bristle 18 in addition to the head portion disposed on the free end of the first bristle. Although only two head portions 22 are disposed on each first bristle 18 (FIG. 8), any number of head portions is contemplated to suit the application. It is preferred that the head portion 22 has a dome-shaped upper region 38 and a flattened lower region 40 (FIG. 8A), but other configurations, such as a round, square, triangle, and other suitable geometric shapes, are also contemplated. As such, this dome shape design of the first bristle 18 provides a gentle stimulation of the animal's skin and an even distribution of natural skin oil throughout an animal's fur or coat as a result of stroking the brush 10 through the animal's fur or coat. As illustrated in FIG. 8A, it is preferred that a lower end 42 of the first bristle 18 includes a securing member 44 having a first predetermined length L1. Included on the securing member 44 is a pair of longitudinally or axially spaced disk formations 45 that sandwich the pad 20 between them to hold the bristle in place as the bristle 18 projects through an opening in the base. An opposite upper end 46 of the first bristle includes a linear section 48 having a second predetermined length L2.

In one embodiment, best seen in FIG. 8A, the head portions 22 of each first bristle 18 are variably spaced apart along the longitudinal axis of the corresponding first bristle at different heights. Thus, an axial spacing between first two head portions 22a and 22b is different from the axial spacing between head portions 22b and 22c. Similarly, the adjacent first bristles 18 are spaced in a variable distance or width relationship with respect to each other. As a result, the first bristles 18 having variably positioned head portions 22 and/or differently spaced adjacent bristles increase a surface contact area and a number of associated edges. This arrangement creates more than one layer of hair removal, and removes more loose hairs than a conventional brush.

While the head portions 22 having the identical shape are shown in FIGS. 8 and 8A, it is contemplated that each head portion 22 has a different shape to suit the application. As discussed above, a suitable number of the head portions 22 is determined based on a hair length of the animal. For example, the longer the hair of the animal, the more the head portions 22 are added on the first bristle 18. An angular orientation and spacing of the head portions 22 are variable to suit different applications. It is also contemplated that a distance or width D4 (FIG. 8A) defined by space between adjacent head portions 22 on each first bristle 18 varies depending on different applications. Another predetermined distance or width D5 (FIG. 8) defined by space between two adjacent first bristles 18 preferably ranges between 0.197 and 0.250 inches. These distances are contemplated as varying to suit the application.

Figure 9:
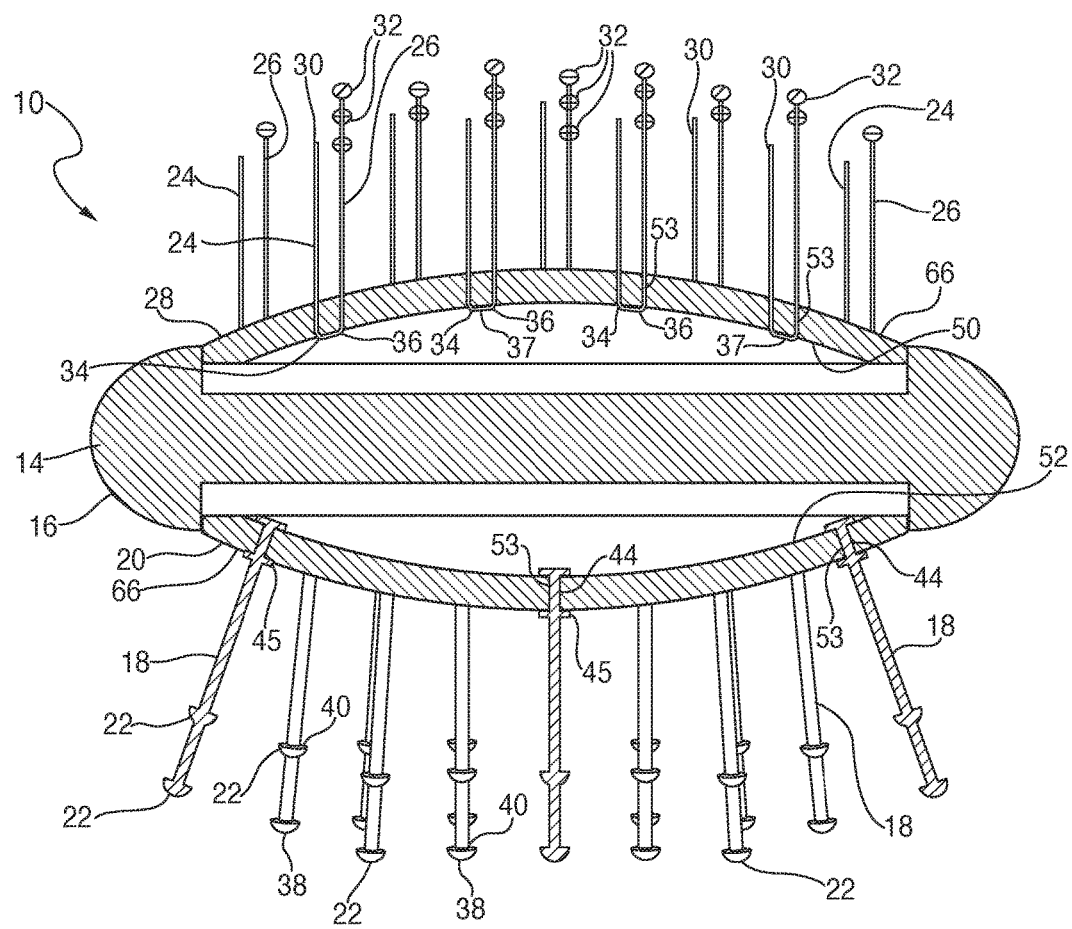
FIG. 9 is a cross-section of the present combo brush taken along the line 9-9 of FIG. 2 and in the direction generally indicated.
Figure 10:
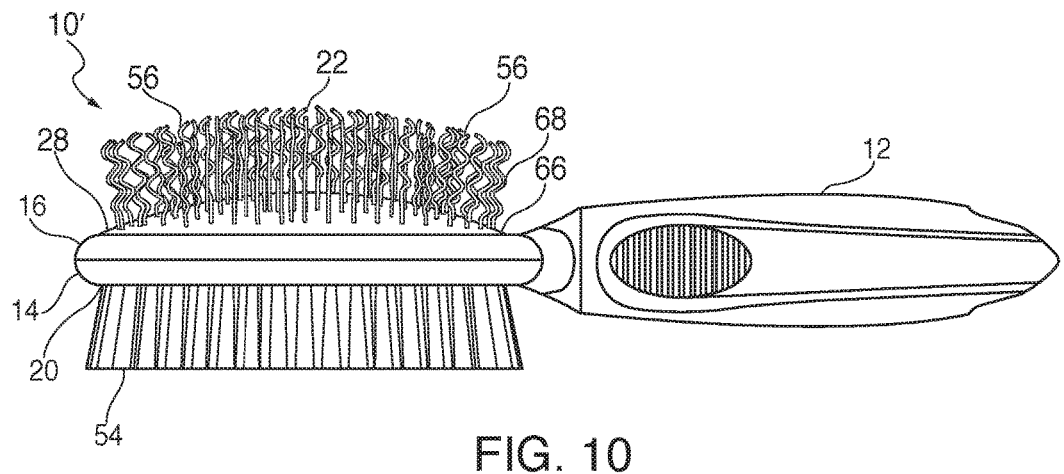
FIG. 10 is a front view of an alternate embodiment of the present combo brush, featuring a double-sided body having fourth bristles arranged on a bottom surface, and fifth bristles arranged on an opposite top surface.
Figure 11:
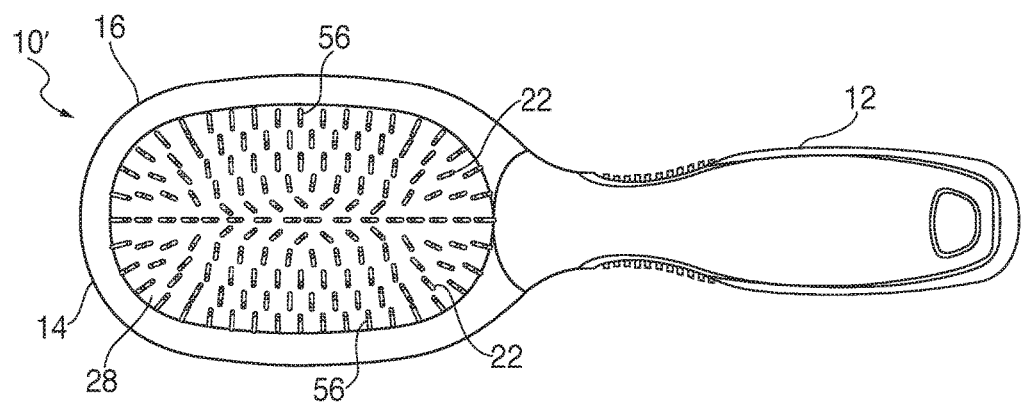
FIG. 11 is a plan view of the combo brush of FIG. 10, showing the fifth bristles.

Referring now to FIG. 9, each "U"-shaped pin having one second bristle 24 and one third bristle 26 is arranged in the second pad 28, and the lower ends 34, 36 of the second and third bristles 24, 26 are attached to an interior surface 50 of the second pad using an adhesive, a tape, or a mesh-type attachment device, as known in the art. Also, each first bristle 18 is arranged in the first pad 20, and the securing member 44 of the first bristle 18 is attached to an interior surface 52 of the first pad in a similar manner described above. As is known in the art, the bristles 18, 26 project through openings 53 in the pads 20, 28. Also, as seen in FIG. 9, the pads 20, 28 are secured to the body 14 of the brush 10 using adhesive, ultrasonic molding, insert molding, or other conventional fabrication technique.

Referring now to FIGS. 10-13, in another embodiment, generally designated 10', is depicted. Components shared with the brush 10 are designated with identical reference numbers. In this embodiment, it is contemplated that the first pad 20 optionally has a plurality of bundles of fourth bristles 54 having the shape of straight wires or other filaments, and the second pad 28 has a plurality of fifth bristles 56 constructed and arranged in a corrugated, or zig-zag configuration. As an example, each fourth bristle 54 is made of a bundle of straight wires configured for brushing or styling the animal's hairs, and cleaning or scraping solids from the animal's hairs. Each fifth bristle 56 has a corrugated shape in a longitudinal direction, directly and substantially vertically extending from the second pad 28. This corrugated design of the fifth bristle 56 allows more efficient capturing and collection of loose hairs per stroke than the conventional brush with a straight pin bristle. One end 58 of each fifth bristle 56 is connected to the second pad 28, and an opposite free end optionally has the radially extending head portion 22.

Figure 12:
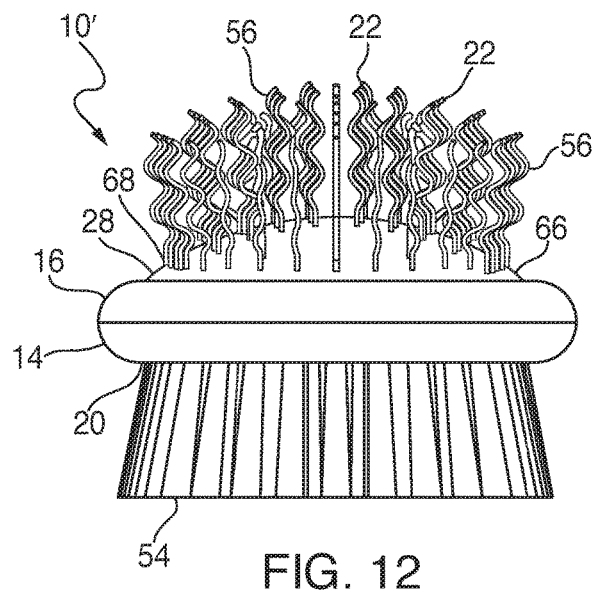
FIG. 12 is a left side view of the combo brush of FIG. 10.
Figure 13:
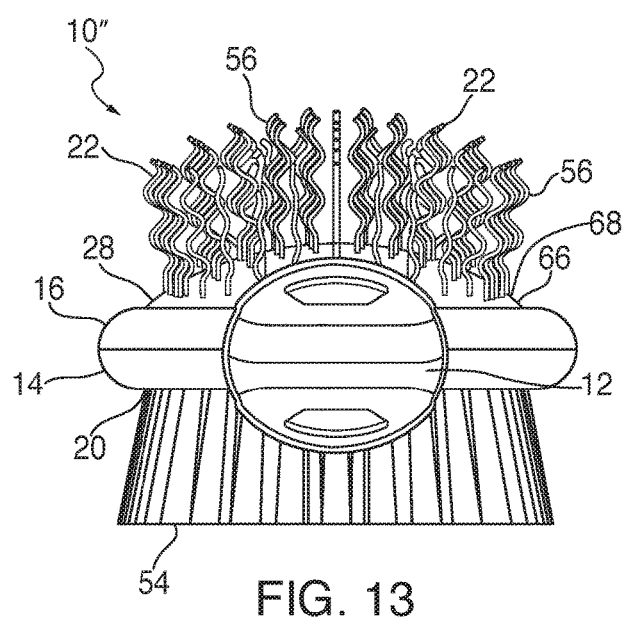
FIG. 13 is a right side view of the combo brush of FIG. 10.
Figure 14:
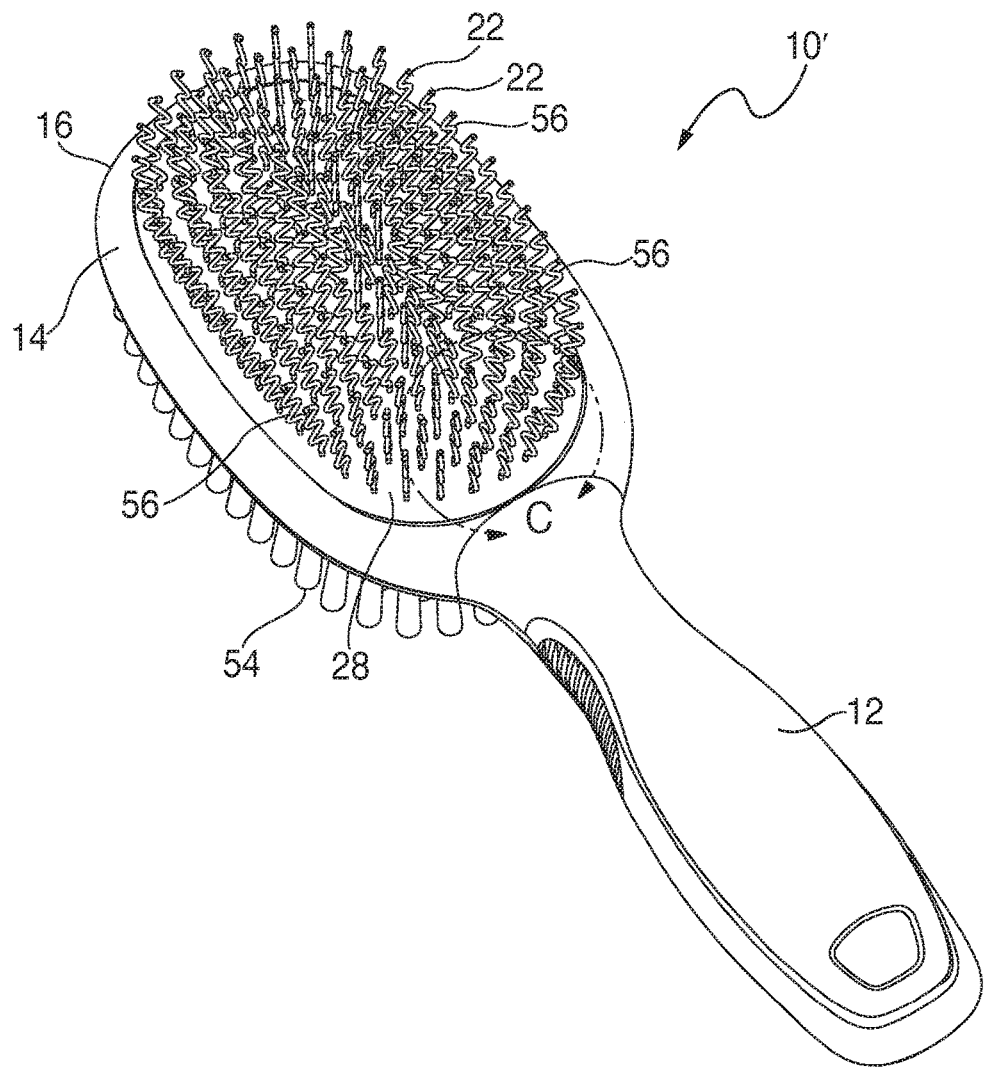
FIG. 14 is a top perspective view of the combo brush of FIG. 10, showing the fifth bristles on the top surface.
Figure 15:
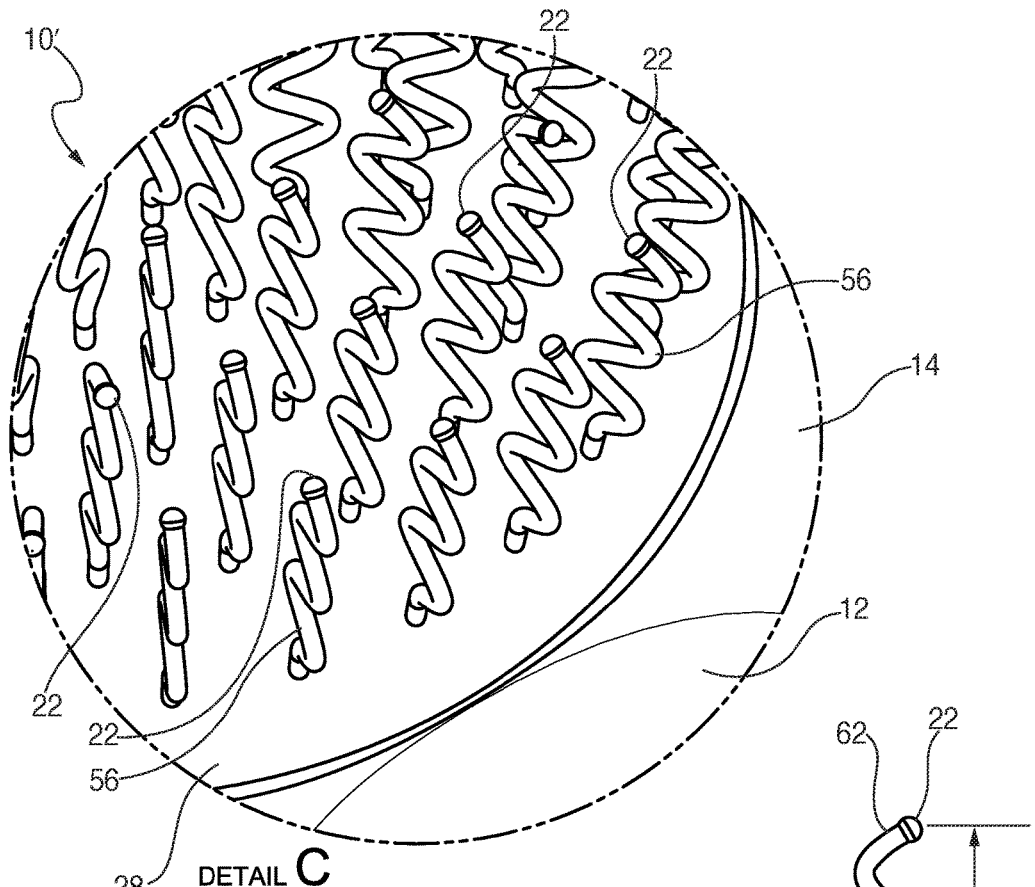
FIG. 15 is a partial, enlarged view of a circled portion C of the combo brush of FIG. 14.

Referring now to FIGS. 12 and 13, when the brush 10' is viewed from the sides, or from the front and rear (FIG. 10), in a preferred embodiment, it is contemplated that the plurality of fifth bristles 56 define the appearance of an interlocking, three-dimensional braided structure on the second pad 28. A spacing pattern between adjacent fifth bristles 56 is variable to suit the application. For example, as illustrated in FIG. 15, the adjacent fifth bristles 56 are positioned so that the pointed "zig-zag" potions in an overlapping (or alternatively non-overlapping) relationship depending on the hair type of the animal. The overlapping relationship between the fifth bristles 56 is achieved by adjusting the distance between the adjacent fifth bristles relative to each other, such that at least one corrugated portion of a first fifth bristle overlaps with at least one corrugated portion of a second adjacent fifth bristle. As a result, the closer the fifth bristles 56 are, the more surface contact the fifth bristles provide during grooming.

Figure 15A:
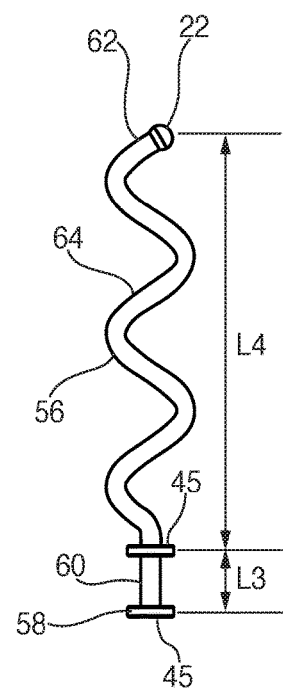
FIG. 15A is an enlarged front elevation view of an exemplary fifth bristle of the combo brush of FIG. 15.

Referring now to FIGS. 15 and 15A, an enlarged view of the fifth bristle 56 is shown. In a preferred embodiment, as is the case with the first bristle 18 shown in FIG. 8A, the lower end 58 of the fifth bristle 56 includes a securing member 60 having a third predetermined length L3, and an opposite upper end 62 of the fifth bristle includes a non-linear section 64 having a fourth predetermined length L4. As described above, the lower end 58 is connected to the second pad 28 using the disks 45, and the opposite upper end 62 optionally has the radially extending head portion 22. An angular orientation and spacing of the non-linear section 64 of the fifth bristle 56 is variable to suit different applications. Attachment of the fifth bristles 56 to the second pad 28 is achieved in a similar manner described above regarding the first bristles 18 shown in FIG. 9.

Figure 16:
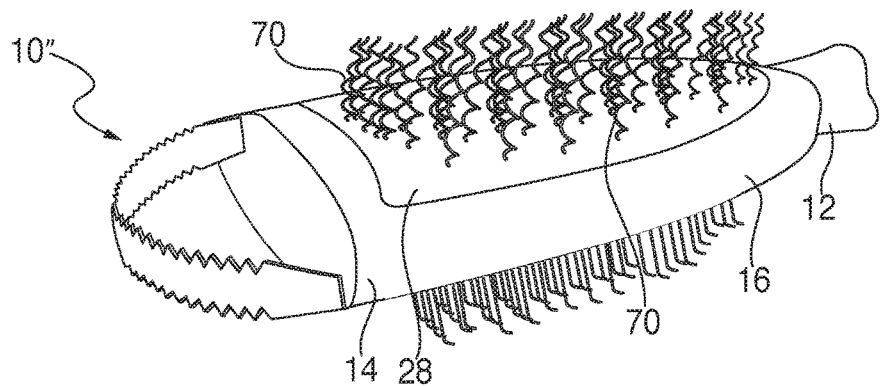
FIGS. 16-18 are elevational views of an alternate embodiment of the present brush showing a plurality of spiral, coil-like bristles projecting from the pad
Figure 17:
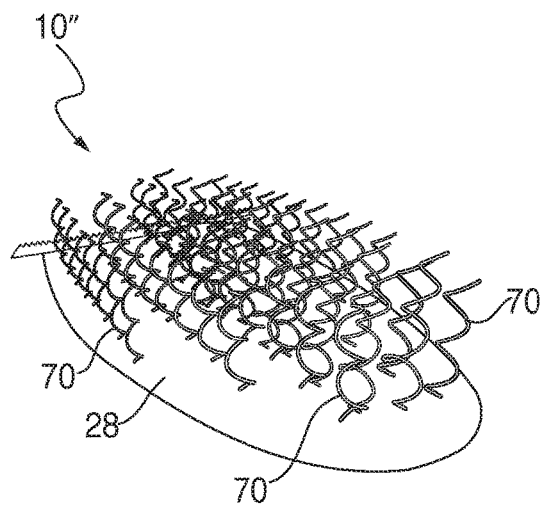
Figure 18:
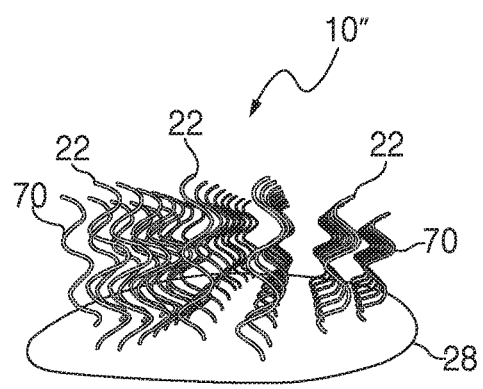

Referring now to FIGS. 16-18, another embodiment of the present brush is generally designated 10". Components shared with the brushes 10 and 10' are designated with identical reference numbers. A main distinction of the brush 10" is that the bristles 70 are helical, spiral or coil-like in configuration. The bristles are contemplated as being made of stainless steel, other metal or a suitable plastic. As is the case with the bristles 56, the free ends are optionally provided with enlarged head portion 22, or are alternately pointed (FIG. 17). Also, the bristles 70 are held to the corresponding pad 28 using disks 45 as seen in FIG. (15A).

Returning now to FIGS. 1, 3, 4, 10, 12, and 13, although the double-head combo brush 10 is shown for illustration purposes, a single-head brush is also contemplated, featuring different combination of the first, second, third, fourth, and fifth bristles 18, 24, 26, 54, 56 to suit the application. Also, while specific combinations of bristles 18, 24, 26, 54, 56 are shown on each pad 20, 28 of the combo brush 10, other suitable combinations of the bristles 18, 24, 26, 54, 56 are also contemplated on each pad depending on different applications.

It is preferred that at least one of the first and second pads 20, 28 has a rounded, arched or curved outer surface 66. As a result, the rounded outer surface 66 of the pad 20, 28 has a convex-arc shape protruding from the body 14, so that the bristles 18, 24, 26, 54, 56 attached to the corresponding pad extend outwardly in a flared manner. Although the body 14, and the first and second pads 20, 28 are shown as separate parts, it is contemplated that the body and pads are integrally formed as a single unit. For example, the first and second pads 20, 28 are injection molded, such that the body 14 is integrally embedded within the pads. Other suitable injection or insert molding processes are also contemplated.

While a particular embodiment of the present combo brush has been shown and described, it will be appreciated by those skilled in the art that changes and modifications may be made thereto without departing from the present disclosure in its broader aspects and as set forth in the following claims.

What is claimed is:

1. A brush configured for removing debris and hairs, the brush comprising:
    at least one surfaced body having a pad;
    a plurality of first bristles and a plurality of second bristles extending from the pad in an alternating pattern, one end of each first bristle being connected to the pad, and an opposite free end of each first bristle having an angled end; and
    one end of each second bristle being connected to the pad, and an opposite free end of each second bristle having a rounded end extending radially past an exterior of said associated second bristle, wherein the plurality of first bristles having the angled end and the plurality of second bristles having the rounded end are intermingled on the same region of the pad;

wherein the first and second bristles are attached together at corresponding lower ends opposite from the free ends of the first and second bristles, forming a "U"-shaped pin.

2. The brush of claim 1, wherein the first and second bristles in alternating rows are arranged in a spaced relationship with respect to each other, providing a predetermined distance between adjacent bristles.

3. The brush of claim 1, wherein the second bristle has a dimension in a longitudinal direction that is longer than the dimension of the first bristle.

4. The brush of claim 1, wherein the angled end of the first bristle has at least one of: an acute angled end, an obtuse angled end, and a right angled end.

5. The brush of claim 1, wherein the "U"-shaped pin is attached to an interior portion of the pad such that the "U"-shaped pin is mounted on and extends uprightly from the pad of the body.

\* \* \* \* \*